United States Patent [19]

Demyon

[11] Patent Number: 4,557,216
[45] Date of Patent: Dec. 10, 1985

[54] SAFETY SIGHT

[76] Inventor: Thomas R. Demyon, Safety-Sight, Inc., 2197 Green Spring Dr., Timonium, Md. 21093

[21] Appl. No.: 540,655

[22] Filed: Oct. 11, 1983

Related U.S. Application Data

[63] Continuation-in-part of Ser. No. 407,176, Aug. 11, 1982, abandoned, which is a continuation of Ser. No. 194,945, Oct. 8, 1980, abandoned, which is a continuation-in-part of Ser. No. 90,705, Nov. 2, 1979, abandoned, which is a continuation of Ser. No. 972,731, Dec. 26, 1978, abandoned.

[51] Int. Cl.[4] .............................................. G01F 23/02
[52] U.S. Cl. ...................................... 116/227; 116/276
[58] Field of Search ............... 116/227, 276, 323, 334; 220/82 R, 82 A; 285/DIG. 10, DIG. 16

[56] References Cited

U.S. PATENT DOCUMENTS

| | | | |
|---|---|---|---|
| 2,374,142 | 4/1945 | Steven | 116/227 |
| 2,917,924 | 12/1959 | Messick | 116/227 |
| 3,248,946 | 5/1966 | Lichtenberg | 116/276 |
| 3,687,493 | 8/1972 | Lock | 285/DIG. 10 |
| 3,977,251 | 8/1976 | Meginnis | 220/82 A |

Primary Examiner—Charles Frankfort
Assistant Examiner—Denis E. Corr
Attorney, Agent, or Firm—Walter G. Finch

[57] ABSTRACT

The invention is an improved safety sight for liquid level detection in containers of liquids. The safety sight provides a means for such detection of the liquid level in automobile radiators, water tanks, oil tanks and other such vessels. The safety sight is composed of an insert for the vessel containing the liquid, a transparent lens or window piece to observe the liquid level, a retainer to hold the lens or window piece in the insert in the vessel and a seal under the lens or window piece to prevent leaks.

4 Claims, 3 Drawing Figures

SAFETY SIGHT

This is a continuation in part of application Ser. No. 407,176, filed Aug. 11, 1982, now abandoned, which is a continuation of application Ser. No. 194,945, filed Oct. 8, 1980, previously abandoned, which was a continuation-in-part of application Ser. No. 90,705, filed Nov. 2, 1979, previously abandoned, which in turn was a continuation of application Ser. No. 972,731 filed Dec. 26, 1978 previously abandoned.

BACKGROUND AND SUMMARY OF THE INVENTION

The invention relates to sight glasses for determining the liquid level in containers for liquids and in particular to sight glasses for containers requiring primarily a decision as to the liquid level being satisfactory or in the need of additional liquid to be added. Specifically, it relates to such containers for liquid such as automobile radiators, household tanks for oil, and similar containers of a liquid requiring a check on the level of the liquid for safety reasons or the like.

In the prior art there are numerous sight gauges, several invented by the present inventor. However, the sight gauges of the prior art are of a complicated nature, require double sealing (often on both sides of the aperture), require extra washers at the seal, special spanner-type wrenches to service, slippage members, or the sight glass itself is threaded and subject to continual breakage. These and other manufacturing, installation, and maintenance problems gave rise to the present invention to solve this plurality of problems.

The present invention is designed to be installed into a tapered threaded aperture. Should the aperture be an existing straight or perpendicular threaded aperture, a Teflon tape wrapping will overcome this difficulty if it provides a problem.

The present invention has a main body into which a single threaded retainer compresses a simple unthreaded sight glass against one single simple seal. This simple four piece assembly constitutes the improved safety sight that overcomes the problems encountered in the prior art. Standard nut wrenches may be used for the installation and servicing.

It is, therefore, an object of the invention to provide a safety sight for liquid level detection in a liquid container.

It is also an object of the invention to provide a safety sight that can be used in pressure vessels or vessels having atmospheric pressure only.

It is another object of the invention to provide a safety sight that requires only one single seal.

It is still another object of the invention to provide a safety sight that is simple to manufacture, install, and maintain.

It is yet another object of the invention to provide a safety sight that is generally installed in a tapered threaded aperture in a liquid container.

It is a further object of the invention to provide a safety sight that is suitable for multiple installation to detect a range of liquid levels in a liquid container.

It is also another object of the invention to provide a safety sight that can have the sight glass element replaced without breaking the connection to the liquid container.

It is yet still another object of the invention to provide a safety sight that requires only a standard nut wrench to install and service.

Further objects and advantages of the invention will become more apparent in light of the following description of the preferred embodiments.

DESCRIPTION OF THE PREFERRED EMBODIMENTS

Figure 1:
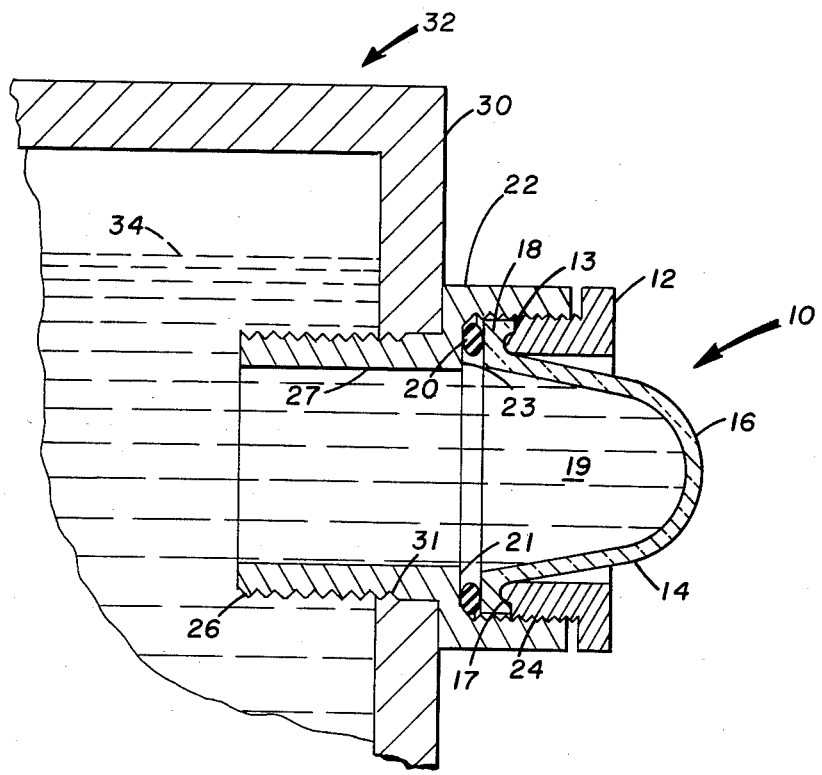
FIG. 1 is a sectional view of a first embodiment of a sight gauge installed in a partial view of a liquid container.
Figure 2:
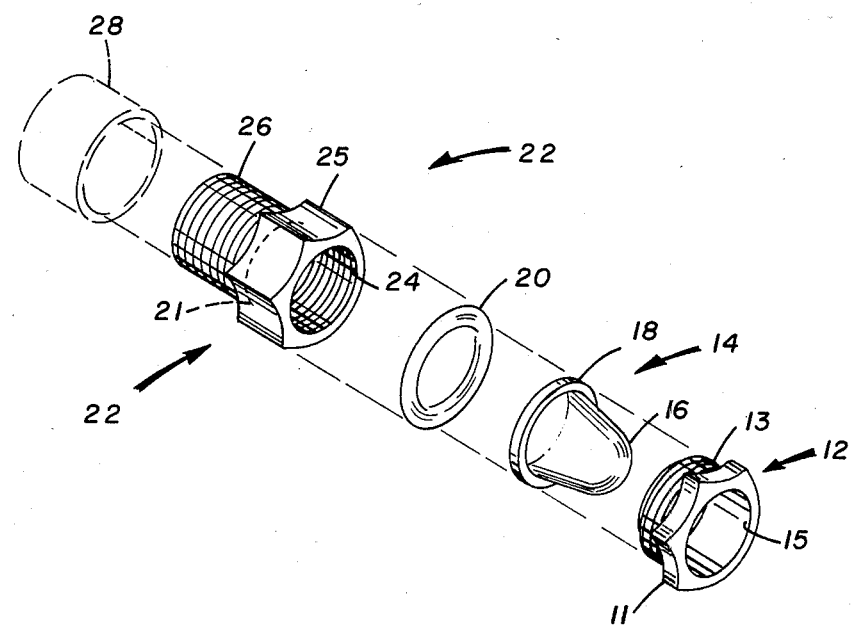
FIG. 2 is an exploded perspective view of the parts of the sight gauge.
Figure 3:
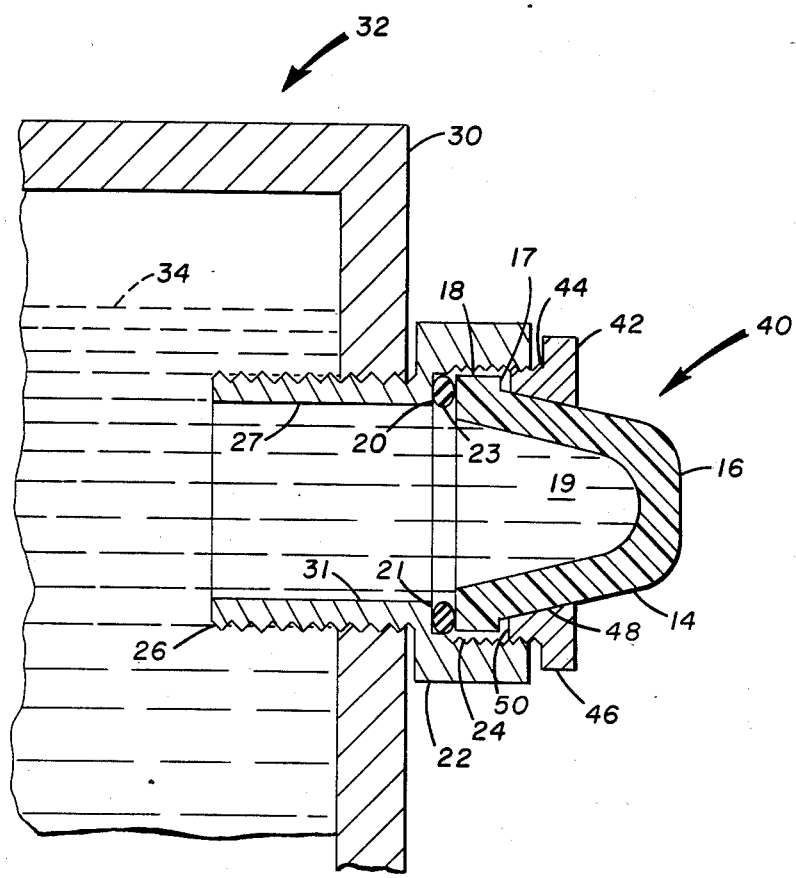
FIG. 3 is a sectional view of a second embodiment of a sight gauge installed in a partial view of a liquid container.

Referring to the drawings and particularly to FIGS. 1 and 3, an assembled safety sight is shown at 10 and 40, FIG. 1 shows a first embodiment and FIG. 3 shows a second embodiment of safety sights 10 and 40 respectively. An exploded perspective view of the components is shown in FIG. 2.

The first embodiment safety sight 10 is comprised of main body 22, a sight glass 14, one single O-ring type or toroidal shaped sealer 20 between the sight glass or window 14 and the body 22, and a one single retainer 12.

The retainer 12 has outside threads 13 that mate with the inside threads 24 in body 22 when the retainer 12 is installed in the body 22 in order to retain the single glass or window 14 in place. The body 22 extends into the container 32.

The retainer 12 has nut-type shoulders 11 so that a standard nut wrench can be used to tighten the retainer 12 into the body 22. When the retainer 12 is screwed into the body 22 and tightened it compresses against the shoulder 18 of the sight glass or window 14 and compresses the sight glass 14 against the one single sealer 20, in turn the one single sealer 20 is compressed against the bottom of the counter-bore 21 at the base of the inside threads 24 in the body 22. The bottom of the retainer 12 interfaces with the shoulder 18 of the sight glass or window 14 at the face 17. Thus, the installation is made without additional washers, sealers, slippage members, or other parts being required between the retainer 12 and the shoulder 18 as in the prior art. The shouler 18 of sight glass or window 14 has an unthreaded exterior peripheral surface.

Thus the assembly of the safety sight 10 is completed as shown in FIG. 1 when retainer 12 is screwed into body 22 and tightened to compress the sight glass or window 14 against the sealer 20 and squeeze the sealer against the shoulder of the counter-bore 21 in the body 22. No slippage member is required on or above the shoulder 18 as the retainer 12 compresses the sight glass or window 14, and the sealer 20 is compressed between the sight glass or window 14 and the bottom of the counter-bore 21 at the base of the inside threads 24.

It is to be noted that the sight glass or window 14 may be glass, plastics, or any other suitable clear material through which the liquid in the liquid container may be detected. Hereinafter the sight glass or window 14 will be referred to as the sight window 14. Such variation is within the scope and intent of the invention.

The material of the sealer 20 may be any rubber-like or plastics-like material suitable for establishing an effective seal against liquid or gas leakage. Gas leakage prevention is as important as liquid leakage when the liquid container vessel is under pressure and the liquid level may be partially or totally below the level of the safety sight 10. Such variations in the material and the use are within the scope and intent of the invention.

The safety sight 10 is shown installed in a wall 30 of a liquid container 32 containing a liquid 34. The safety sight 10 is installed in an aperture having tapered threads 31 in a wall 30 of any liquid container 32.

The installation of safety sight 10 in the wall 30 of the liquid container 32 is made by screwing the body 22 of the assembled safety sight 10 into the aperture having tapered threads 31, hereinafter referred to as the aperture 31.

The body 22 has outside tapered threads 26 to mate with the tapered threads of the aperture 31. Thus, as the body 22 is screwed into the aperture 31 the tapered threads automatically compress into a tightly sealed connection without the need of a second sealer, The body 22 is tightened into the aperture 31 by using a wrench on the nut-type shoulder 25 of the body 22.

It is to be noted that the nut-type shoulders 11 and 25 may be square, hexagonal or any other geometrical configuration. The shoulders may also be round or round and knurled for use of a biting type wrench instead of a socket or open-end type wrench. All such variations of the wrench shoulders are within the scope and intent of this invention.

There is the possibility that an existing aperture for a safety sight 10 may not have tapered threads. Provision is made for assuring a tight seal of the tapered threads 26 of the body 22 in such an existing square-type thread in an existing aperture. A piece of Teflon tape 28 may be wrapped around the tapered threads 26 as the body 22 is screwed into the existing aperture. The seal is formed and assured as the Teflon tape 28 is pressed into the mating of the tapered threads 26 with the existing untapered threads.

It is to be noted that the body 22 may be constructed without threads and welded, brazed, or pressed into a wall 30 of a liquid container 32. Such a variation is within the scope and intent of this invention.

Regarding the sight window 14, the configuration is such that bulb-like end 16 is particularly elongated and protrudes through the internal passageway 15 of the retainer 12 and extends above the retainer a sufficient distance so that the liquid level within the sight window 14 is easily observed. Many sight windows of the prior art were either flat or protruded very little and made observation of the liquid level difficult, some requiring special retaining means to permit the sight window to be observed.

Thus, the liquid 34 in the liquid container 32 may flow into the internal passageway 27 of the body 22, then through the internal passageway 23 of the sealer 20, and into the internal cavity 19 of the sight window 14 where it can be detected and observed in the elongated blulb-like end 16. The flow of the liquid 34 through and into said structure parts is facilitated by communication of these structural parts internally. The internal cavity 19 of the sight window 14 is cone shaped with a rounded apex. The internal surface of the cone configuration is straight and continuous without a break or angle change of direction except the rounded apex to assure a smooth flow and undistorted observation of liquid or lack of liquid therein, the exterior surface of the sight window 14 paralleling the cone shaped internal cavity 19 interior surface.

The safety sight 10 may be installed in any wall 30 of a liquid container 32. The safety sight 10 may be installed in a plurality of locations at various levels in the liquid container 32, if desired, in order to detect and observe the liquid level at a range of points in the liquid container 32.

With this invention, the sight window 14 can be replaced if damaged without breaking the seal of the body 22 in the wall 30 of the liquid container 32. This is done by merely unscrewing the retainer 12, removing the damaged sight window 14 (and the seal 20 if necessary), and installing a view new sight window 14 (and seal 20 if necessary) and then screwing the retainer 12 back into place in the body 22.

The body 22 and retainer 12 may be metal or any other suitable material. Any such variation is within the scope and intent of this invention.

Turning now to the second embodiment 40 shown in FIG. 3, the assembly, disassembly, operation, and general structure is substantially like the first embodiment 10 shown in FIG. 1 except that a retainer 42 is used instead of retainer 12. Retainer 42 has specific novel and unique features for sepecific uses and purposes as described hereinafter. An exploded view of the second embodiment 40 would be similar to FIG. 2 except that the first embodiment retainer 12 would be replaced by the second embodiment retainer 42.

Retainer 42 has a first portion having external threads 44 thereon and a second portion having a nut-like shaped configuration 46, both similar to the outside threads 13 and the nut-type shoulders 25 of the first embodiment 12.

Retainer 42 differs from the first embodiment retainer 12 in that the internal passageway 48 therethrough has a sloped configuration which matches, mates, and coincides with the external conical-like sloped surface of the sight glass 14.

When retainer 42 is threadably and removably assembled into the main body 22, the external threads 44 of the retainer 42 mating with the inside threads 24 of the main body 22, the sloped internal passageway 48 mates with the external conical-like sloped surface of the sight glass 14 and forces the sight glass 14 inwardly against the sealer 20 to form the liquid tight seal.

The inward face 50 of retainer 42 does not interface with the shoulder 18 of the sight glass 14 as may be noted in FIG. 3. This is important and an improvement when the materials used for sight glass 14 are brittle and tend to crack or break when pressure is brought to bear on the shoulder 18. On non-breakable and on brittle type sight glasses 14 the improved retainer 42 of the second embodiment 40 provides an even downward pressure that eliminates problems that may be encountered with a retainer 12.

Materials for retainer 42 may be metal or a plastics or other similar and suitable material. Materials such as plastics provide a lubricated-like interface between the internal passageway 48 of the retainer 42 and the exterior surface of the sight glass 14, thereby making the sliding contact easier when assembling the components.

The depth of the internal passageway 48 may be varied to spread the pressure load over a greater external surface of the sight glass 14 to reduce any possibility of breakage, whereas the pressure area is limited in a configuration such as in the retainer 12. The height of sight glass 14 can be varied accordingly.

As can be readily understood from the foregoing description of the invention, the present structure can be configured in different modes to provide the ability to observe the liquid level in a container for liquids.

Accordingly, modifications and variations to which the invention is susceptible may be practiced without departing from the scope and intent of the appended claims.

What is claimed is:

1. A four piece safety sight device for detecting the liquid level in a container for liquids, comprising:
a body means, said body means consisting of a main body structure, said main body structure having an internal passageway therethrough, said main body structure having a first portion and a second portion, said first portion having a tapered external screw thread on the exterior thereof, said second portion having an external nut-like shoulder, said nut-like shoulder being configured for a standard nut wrench on the exterior thereof, said nut-like being on its outside wider than the outside diameter of said first portion, said second portion having a counter-bored recess, said counter-bored recess being located in one end of said internal passageway within said second portion, said counter-bored recess having an internal thread therein, said counter-bored recess providing an internal shoulder therein, said first portion being threadably and removably inserted in a tapered inside thread of an aperture in a wall of said container for liquids, said threaded first portion being of a length to extend through the wall of said container for liquids and into the inside of said container for liquids;
a sight window means, said sight window means being configured as an elongated bulb-like member, said elongated bulb-like member being closed at one end and open at the other end to form a cone shaped cavity with rounded apex and no angle breaks therein, said elongated bulb-like member having an exterior surface, said elongated bulb-like member having an exterior shoulder formed with a concave surface encircling said elongated bulb-like member at the end thereof which is open, said exterior shoulder of said sight window means being the distal end thereof, said exterior surface of said elongated bulb-like member being conical-like and paralleling the inside surface of said cone-shaped cavity, said sight window means being removably affixed to said body means whereby said exterior shoulder on said elongated bulb-like member is removably inserted within said counter-bore, said closed end of said elongated bulb-like member thereby projecting substantially from said counter-bore to the exterior thereof;
a one single seal means, said seal means being an O-ring type seal and toroidal in configuration, said seal means being removably placed within said counter-bored recess and located upon said internal shoulder of said counter-bored recess and thereby between said body means and said sight window means in said counter-bored recess; and
a one piece retainer means, said one piece retainer means having an internal passageway therethrough, said one piece retainer means having a first end portion and a second end portion, said first and second end portions having an inward and an outward end, respectively, said first end portion of said one piece retainer means having an external thread thereon, said external thread being capable of mating with said internal thread in said counter-bore recess of said main body structure, said inward end of said first end portion being the distal end thereof, said second end portion of said one piece retainer means having an external nut-like shoulder, said nut-like shoulder being configured for a standard nut wrench on the exterior thereof, said nut-like shoulder on said second end portion being on it outside wider than the outside diameter of said first end portion of said one piece retainer means, said outward end of said second portion being the exterior surface thereof, said one piece retainer means being threadably and removably affixed to said body means by insertion into said counter-bore recess to mate with said internal thread in said counter-bore recess so as to couple and compact said body means, said seal means, and said sight window means together as a tightly sealed unit, said distal end of said first end portion of said one piece retainer means including a convex surface portion contacting directly with said concave surface of said exterior shoulder on said bulb-like member when compactly assembled therewith, said single seal means being sealably compacted between said internal shoulder of said counter-bore recess and said distal end of said sight window means, said elongated bulb-like member of said sight window means extending and protruding extensively through said retainer means and beyond said exterior surface thereof.

2. A four piece safety sight device as recited in claim 1, and additionally, a section of suitable tape, said tape serving as a seal when placed upon said tapered external thread when said tapered external thread is installed in a threaded aperture where said tapered inside thread is engaged with non-tapered threads in said wall of said container for liquids, said taper being thereby compressed between said tapered and non-tapered threads.

3. A four piece safety sight device for detecting the liquid level in a container for liquids, comprising:
a body means, said body means consisting of a main body structure, said main body structure having an internal passageway therethrough, said main body structure having a first portion and a second portion, said first portion having a tapered external screw thread on the exterior thereof, said second portion having an external nut-like shoulder, said nut-like shoulder being configured for a standard nut wrench on the exterior thereof, said nut-like shoulder being on its outside wider than the outside diameter of said first portion, said second portion having a counter-bored recess, said counter-bored recess being located in one end of said internal passageway within said second portion, said counter-bored recess having an internal thread therein, said counter-bored recess providing an internal shoulder therein, said first portion being threadably and removably inserted in a tapered inside thread of an aperture in a wall of said container for liquids, said threaded first portion being of a length to extend through the wall of said container for liquids and into the inside of said container for liquids;
a sight window means, said sight window means being configured as an elongated bulb-like member, said elongated bulb-like member being closed at one end and open at the other end to form a cone shaped cavity with rounded apex and no angle breaks therein, said elongated bulb-like member having an exterior surface, said elongated bulb-like member having an exterior shoulder encircling said elongated bulb-like member at the end thereof which is open, said exterior shoulder of said sight window means being the distal end thereof said exterior surface of said elongated bulb-like member being conical-like and paralleling the inside surface of said cone shaped cavity, said sight window means being removably affixed to said body means whereby said exterior shoulder on said elongated bulb-like member is removably inserted within said counter-bore, said closed end of said elongated bulb-like member thereby projecting substantially from said counter-bore to the exterior thereof;

a one single seal means, said seal means being an O-ring type seal and toroidal in configuration, said seal means being removably placed within said counter-bored recess and located upon said internal shoulder of said counter-bored recess and thereby between said body means and said sight window means in said counter-bored recess; and a one piece retainer means, said one piece retainer means having an internal passageway therethrough, said internal passageway through said one piece retainer means being sloped conical-like so that the inside surface of said internal passageway through said one piece retainer means parallels and has mating contact with said conical-like exterior surface of said sight window means, said one piece retainer means having a first end portion and a second end portion, said first end portion of said one piece retainer means having an external thread thereon, said external thread being capable of mating with said internal thread in said counter-bore recess of said main body structure, said second end portion of said one piece retainer means having an external nut-like shoulder, said nut-like shoulder being configured for a standard nut wrench on the exterior thereof, said nut-like shoulder on said second end portion being on its outside wider than the outside diameter of said first end portion of said one piece retainer means, said one piece retainer means being threadably and removably affixed to said body means by insertion into said counter-bore recess to mate with said internal thread in said counter-bore recess so as to couple and compact said body means, said seal means, and said sight window means together as a tightly sealed unit, said conical-like slope of said internal passageway through said one piece retainer means compacting said sight window means against said seal means by said contact there between as said one piece retainer means is tightened and compactly assembles the components together, said retainer means being spaced from said shoulder after final assembly so as to prevent cracking or breaking when pressure is brought to bear on said exterior shoulder of said bulb-like member, said single seal means being sealably compacted between said internal shoulder of said counter-bore recess and said distal end of said sight window means, said elongated bulb-like member of said sight window means extending and protruding extensively through said retainer means and beyond said exterior surface thereof.

4. A four piece safety sight device as recited in claim 3, and additionally, a section of suitable tape, said tape serving as a seal when placed upon said tapered external thread when said tapered external thread is installed in a threaded aperture where said tapered inside thread is engaged with non-tapered threads in said wall of said container for liquids, said tape being thereby compressed between said tapered and non-tapered threads.

* * * * *